United States Patent
Hondo et al.

(10) Patent No.: US 12,479,124 B2
(45) Date of Patent: Nov. 25, 2025

(54) ADDITIVE MANUFACTURED FIRED BODY, AND METHOD FOR MANUFACTURING THE ADDITIVE MANUFACTURED FIRED BODY

(71) Applicant: Noritake Co., Limited, Nagoya (JP)

(72) Inventors: Tsuyoshi Hondo, Miyoshi (JP); Akihiro Kawahara, Miyoshi (JP)

(73) Assignee: Noritake Co., Limited (JP)

( * ) Notice: Subject to any disclaimer, the term of this patent is extended or adjusted under 35 U.S.C. 154(b) by 75 days.

(21) Appl. No.: 18/043,446

(22) PCT Filed: Aug. 18, 2021

(86) PCT No.: PCT/JP2021/030235
§ 371 (c)(1),
(2) Date: Feb. 28, 2023

(87) PCT Pub. No.: WO2022/044930
PCT Pub. Date: Mar. 3, 2022

(65) Prior Publication Data
US 2023/0330890 A1    Oct. 19, 2023

(30) Foreign Application Priority Data
Aug. 31, 2020   (JP) .................. 2020-145503

(51) Int. Cl.
*B28B 1/00*   (2006.01)
*B33Y 10/00*  (2015.01)
(Continued)

(52) U.S. Cl.
CPC .............. *B28B 1/001* (2013.01); *B33Y 10/00* (2014.12); *B33Y 40/20* (2020.01); *B33Y 80/00* (2014.12)

(58) Field of Classification Search
CPC .. B28B 1/001; C04B 2235/6026; B33Y 10/00
See application file for complete search history.

(56) References Cited

U.S. PATENT DOCUMENTS 9,833,839 B2 *  12/2017  Gibson ................ B33Y 80/00
2010/0028645 A1 *  2/2010  Maguire ............... B28B 1/001
                                                        428/688
(Continued)

FOREIGN PATENT DOCUMENTS

JP   2017024929   2/2017
JP   2017077707   4/2017
(Continued)

OTHER PUBLICATIONS

European Patent Office, Supplementary European Search Report, EP Appln. 21861358, 14 pgs Sep. 2, 2024.
(Continued)

*Primary Examiner* — Erin Snelting
(74) *Attorney, Agent, or Firm* — Gerald W. Roberts; John V. Daniluck; Dentons Bingham Greenebaum LLP

(57) ABSTRACT

Provided is a technique to manufacture an additive manufactured fired body in which the occurrence of deformation or the like is suppressed at a high level. Provided is a method for manufacturing an additive manufactured fired body, the method including a manufacturing step of manufacturing an additive manufactured object by using an additive manufacturing powder, and a firing step of obtaining the additive manufactured fired body by firing the additive manufactured object. In the manufacturing step, a supporter 20 that supports the additive manufactured object 10 is shaped together with the additive manufactured object 10 so as to surround the additive manufactured object 10 by using the additive manufacturing powder.

7 Claims, 4 Drawing Sheets

(51) Int. Cl.
B33Y 40/20 (2020.01)
B33Y 80/00 (2015.01)

(56) References Cited

U.S. PATENT DOCUMENTS

| | | | |
|---|---|---|---|
| 2017/0113413 A1 | 4/2017 | Iwase et al. | |
| 2018/0154438 A1* | 6/2018 | Mark | B33Y 40/20 |
| 2018/0154439 A1* | 6/2018 | Mark | B22F 5/10 |
| 2018/0154574 A1* | 6/2018 | Mark | B22F 1/10 |
| 2018/0154580 A1* | 6/2018 | Mark | B22F 3/24 |
| 2018/0243826 A1 | 8/2018 | Okamoto et al. | |
| 2018/0307210 A1* | 10/2018 | Chin | B29C 64/40 |
| 2019/0047212 A1* | 2/2019 | Bartos | B29C 64/135 |
| 2019/0177239 A1 | 6/2019 | Chaput et al. | |
| 2019/0270254 A1* | 9/2019 | Mark | B29C 64/118 |
| 2019/0375008 A1* | 12/2019 | Barua | B22F 10/43 |
| 2020/0047252 A1* | 2/2020 | Kritchman | C04B 35/56 |
| 2021/0138552 A1* | 5/2021 | Hildreth | C04B 35/565 |

FOREIGN PATENT DOCUMENTS

| | | |
|---|---|---|
| JP | 2018141225 | 9/2018 |
| JP | 2019513183 | 5/2019 |
| JP | 2019107889 | 7/2019 |
| JP | 2019111803 | 7/2019 |
| JP | 2019123208 | 7/2019 |
| JP | 2020501018 | 1/2020 |
| JP | 2020501019 | 1/2020 |
| JP | 2020501022 | 1/2020 |
| JP | 2020084311 | 6/2020 |
| WO | 2017143005 | 8/2017 |
| WO | 2018102021 | 6/2018 |
| WO | 2018102731 | 6/2018 |
| WO | 2018102754 | 6/2018 |
| WO | 2018193306 | 10/2018 |

OTHER PUBLICATIONS

International Bureau, Notification of Transmittal of Translation of the International Preliminary Report On Patentability and accompanying International Preliminary Report On Patentability (English translation), under Chapter I of the Patent Cooperation Treaty, 6 pages total, issued Feb. 28, 2023, mailed Mar. 9, 2023.
European Patent Office, Examination Report, EP Appln. 21861358.6, Jun. 24, 2025, 9 pages.

* cited by examiner

ADDITIVE MANUFACTURED FIRED BODY, AND METHOD FOR MANUFACTURING THE ADDITIVE MANUFACTURED FIRED BODY

TECHNICAL FIELD

The present invention relates to an additive manufactured fired body and a method for manufacturing the additive manufactured fired body. More specifically, the present invention relates to a configuration of an additive manufactured fired body and a supporter that supports the additive manufactured fired body and surrounds the additive manufactured fired body. This application claims priority based on Japanese Patent Application No. 2020-145503 filed on Aug. 31, 2020, the entire contents of which are incorporated herein by reference.

BACKGROUND ART

Conventionally, in one method of additive manufacturing (also called three-dimensional manufacturing), a mixture of a powder material and a water-soluble resin is layered, and water is applied to a predetermined area to solidify the water-soluble resin, thereby forming a solidified powder layer. By successively layering the solidified powder layers, it is possible to shape an additive manufactured object (three-dimensional structure) having a desired three-dimensional shape. It is known that when an additive manufactured object is shaped in additive manufacturing using a powder material (powder additive manufacturing), a supporter that supports the additive manufactured object is shaped to maintain, as appropriate, the shape of the additive manufactured object (Patent Literature 1-6).

CITATION LIST

Patent Literature

Patent Literature 1: Japanese Translation of PCT Application No. 2019-513183
Patent Literature 2: Japanese Translation of PCT Application No. 2019-123208
Patent Literature 3: Japanese Translation of PCT Application No. 2020-501022
Patent Literature 4: Japanese Translation of PCT Application No. 2020-501018
Patent Literature 5: Japanese Translation of PCT Application No. 2020-501019
Patent Literature 6: Japanese Translation of PCT Application No. 2019-107889

SUMMARY OF INVENTION

Technical Problem

In the powder additive manufacturing as described above, typically, after forming an additive manufactured object, the additive manufactured object is dried and fired. Due to this drying, deformation may occur in the additive manufactured object between the completion of shaping of the additive manufactured object and the firing. In that case, there is a concern that an additive manufactured fired body is manufactured by firing the additive manufactured object in which such deformation remains. Alternatively, deformation may occur in the process of firing the additive manufactured object. In recent years, many cores for precision casting have been manufactured using powder additive manufacturing. Therefore, there is an increasing demand for suppression of deformation in additive manufactured objects.

The present invention has been made in view of the above points, and an object thereof is to provide an art for manufacturing an additive manufactured fired body in which the occurrence of deformation and the like is suppressed at a high level.

Solution to Problem

The inventors of the present invention focused on producing a supporter using the same powder material as the powder material constituting the additive manufactured object at the same time when producing the additive manufactured object. It was found that by shaping an additive manufactured object so as to surround the periphery thereof with such a supporter, it is possible to remarkably suppress the deformation of the additive manufactured object that is caused by drying and firing, and this finding led to the completion of the present invention.

According to the art disclosed herein, there is provided a method for manufacturing an additive manufactured fired body, the method including: a manufacturing step of manufacturing an additive manufactured object by using an additive manufacturing powder; and a firing step of obtaining the additive manufactured fired body by firing the additive manufactured object.

In the manufacturing step, a supporter that supports the additive manufactured object is manufactured together with the additive manufactured object so as to surround the additive manufactured object by using the additive manufacturing powder.

According to the manufacturing method of a configuration, it is possible to suppress deformation of the additive manufactured object during the manufacturing process (for example, drying, firing, and the like), and to provide an additive manufactured fired body in which such deformation is suppressed.

In the present description, "surrounding" is not necessarily limited to a mode in which 100% by volume of the additive manufactured object is arranged inside the supporter. "A state in which an additive manufactured object is surrounded by a supporter" means that at least 50% by volume or more of the additive manufactured object is arranged inside the supporter.

In a preferred mode, in the firing step, the additive manufactured fired body and a fired body of the supporter are obtained by firing so that the additive manufactured object and the supporter are not joined to each other.

According to such a configuration, the effect of suppressing the deformation of the additive manufactured object can be more suitably exhibited, and the ease of removing the supporter fired body can be improved.

Preferably, in the firing step, in the firing step the additive manufactured fired body and the fired body of the supporter, which are mutually independent, are obtained by firing the additive manufactured object and the supporter in a state in which an interference material composed of an inorganic substance for preventing the additive manufactured object from coming into contact with the supporter is arranged between the additive manufactured object and the supporter.

According to such a configuration, it is possible to prevent the additive manufactured object and the supporter from being joined inside the supporter, and the ease of removing the supporter fired body can be improved.

Preferably, the supporter has a mesh shape.

According to this configuration, in addition to the effects described above, surplus powder can be efficiently removed when powder is removed in the manufacturing method disclosed herein. In addition, the additive manufactured object arranged inside the supporter can be easily visually recognized.

Preferably, the additive manufacturing powder includes ceramic particles.

Such a configuration is suitable for providing an additive manufactured fired body made of ceramic.

Preferably, the ceramic particles include any of oxides, nitrides, carbides, and sulfides including at least one element selected from the group consisting of aluminum (Al), zirconium (Zr), titanium (Ti), zinc (Zn), nickel (Ni), iron (Fe), magnesium (Mg), calcium (Ca), and silicon (Si).

Such a configuration is suitable for providing a ceramic additive manufactured fired body including the above materials.

In a preferred mode, the interference material is configured to be particulate, and an average particle size of the particulate interference material is larger than an average particle size of the ceramic particles.

According to such a configuration, the effect of suppressing the deformation of the additive manufactured object can be suitably exhibited, particularly when a ceramic additive manufactured fired body is produced, and the ease of removing the supporter can be improved.

In addition, according to the art disclosed herein, an additive manufactured fired body is provided. The additive manufactured fired body is arranged in a state of being surrounded by a fired body of a supporter that supports the additive manufactured fired body.

In such an additive manufactured fired body, deformation from the additive manufactured object is suppressed.

Here, "a state in which an additive manufactured fired body is surrounded by a supporter fired body" means that at least 50% by volume or more of the additive manufactured fired body is arranged inside the supporter fired body.

In a preferred mode, the additive manufactured fired body is not joined mutually to the supporter fired body and is movable inside the supporter fired body.

With the additive manufactured fired body having such a configuration, in addition to the effects described above, the ease of removing the supporter fired body is improved.

Preferably, the additive manufactured fired body and the supporter fired body are composed of ceramic bodies having a same composition.

According to such a configuration, in addition to the above effects, the ease of manufacturing the additive manufactured fired body is improved.

Preferably, the supporter fired body has a mesh shape.

With such a configuration, the ease of removing the supporter fired body and the ease of manufacturing the additive manufactured fired body are further improved. In addition, the additive manufactured fired body arranged inside the supporter fired body can be easily visually recognized from the outside.

Preferably, the ceramic bodies include any of oxides, nitrides, carbides, and sulfides including at least one element selected from the group consisting of aluminum (Al), zirconium (Zr), titanium (Ti), zinc (Zn), nickel (Ni), iron (Fe), magnesium (Mg), calcium (Ca), and silicon (Si).

Such a configuration can be preferably realized in a ceramic additive manufactured fired body including the above materials.

DESCRIPTION OF EMBODIMENTS

A preferred embodiment of the present invention will be described below. Matters other than those specifically referred to in this description and matters necessary for the implementation of the present invention can be understood on the basis of the technical contents taught by this description and the common technical knowledge of a person skilled in the art in the pertinent field. The present invention can be implemented based on the contents disclosed in this description and the common technical knowledge in the field.

In addition, in the present description and claims, when a predetermined numerical range is described as A to B (A and B are arbitrary numerical values), it means A or more and B or less. Therefore, such description encompasses values above A and below B.

The art disclosed herein can be applied to various kinds of additive manufacturing for manufacturing an additive manufactured object having a desired three-dimensional shape by binding an inorganic material including an additive manufacturing powder with a binder to form a cured layer (powder solidified layer) having a predetermined cross-sectional shape and forming by sequentially layering such cured layers. The art disclosed herein is particularly preferably applied to additive manufacturing using powder-bonded layering method. In such a powder-bonded layering method, typically, after depositing the powder for additive manufacturing in a thin layer, a shaping liquid including water is mixed in a predetermined region of the deposit to form a cured layer, and an additive manufactured object is manufactured by repeatedly layering the cured layers. Hereinafter, the present invention will be described more specifically mainly by taking as an example the case of applying the present invention to additive manufacturing using the powder-bonded layering method, but the scope of the present invention is not intended to be limited. For example, the present invention can also be applied to a stereolithography art. In the stereolithography art, typically, an additive manufactured product can be manufactured by irradiating a slurry of inorganic particles (for example, ceramic particles) mixed with a photocurable resin with light to cure the slurry. In addition, the present invention can also be applied to additive manufacturing art using gypsum (for example, anhydrous gypsum (anhydrous calcium sulfate: $CaSO_4$)), cement, or the like.

Figure 1:
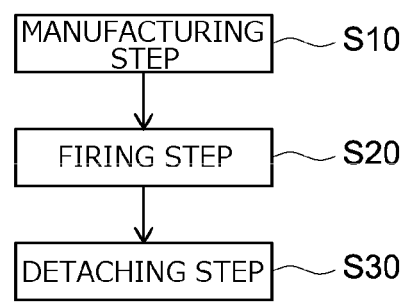
FIG. 1 is a flow diagram schematically showing a method for manufacturing an additive manufactured fired body according to an embodiment.

As shown in FIG. 1, the method for manufacturing an additive manufactured fired body disclosed herein in general includes a manufacturing step S10, a firing step S20, and a detaching step S30.

<Manufacturing Step>

The manufacturing step S10 includes manufacturing an additive manufactured object using an additive manufacturing powder. This manufacturing can be performed using an additive manufacturing apparatus in which a stereo object is manufacturing based on three-dimensional data or the like corresponding to an additive manufactured object to be manufactured. In the present embodiment, an additive manufactured object is manufactured by a powder-bonded layering method using powder for additive manufacturing.

In the manufacturing method disclosed herein, when the additive manufactured object is manufactured as described above in the manufacturing step S10, a supporter for supporting the additive manufactured object is also manufactured. In other words, objects to be manufactured in this step are the target additive manufactured object and the supporter.

Figure 2:
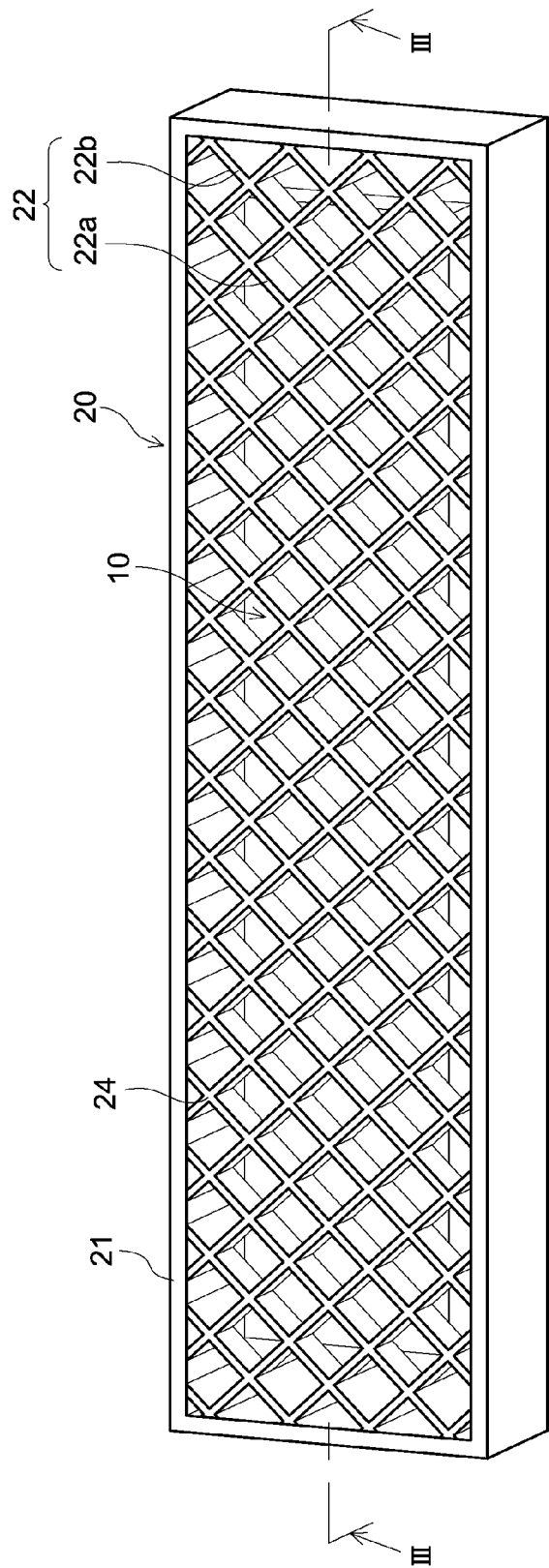
FIG. 2 is a schematic perspective view showing an additive manufactured object and a supporter according to an embodiment.
Figure 3:
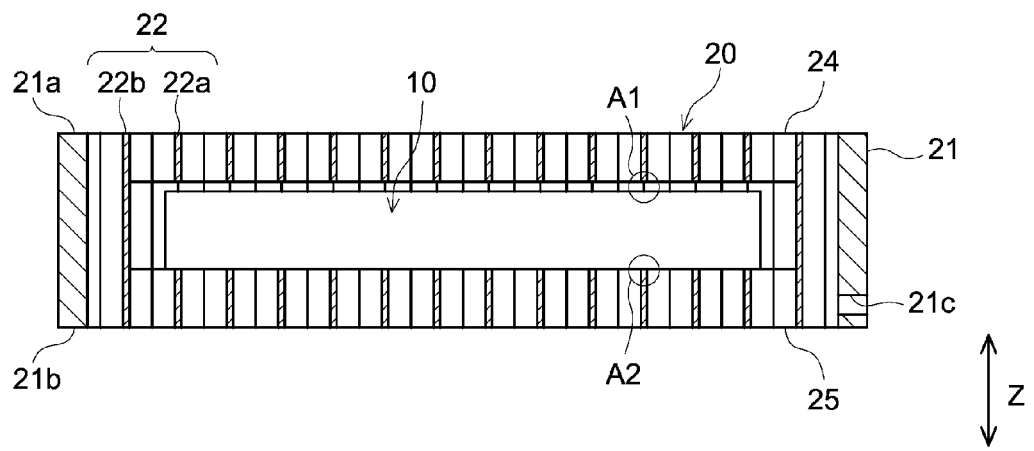
FIG. 3 is a cross-sectional view taken along line in FIG. 2.

As shown in FIGS. 2 and 3, a supporter 20 is provided with a frame 21 that is opened on at least one (two ends 21a and 21b in the present embodiment) of two ends in one predetermined direction (the Z direction in FIG. 3). The supporter 20 is provided with a holding portion 22 so as to close the openings of the frame 21. An additive manufactured object 10 is surrounded inside the supporter 20 by the frame 21 and the holding portion 22.

The holding portion 22 is preferably configured so that the additive manufactured object 10 surrounded inside the supporter 20 can be visually recognized from the outside. With such a configuration, it is possible to improve the workability in the powder removal step and the firing step, which will be described hereinbelow. In the present embodiment, the holding portion 22 is configured in a netlike shape (mesh shape). Such a netlike shape is formed by connecting one tip of a first holding portion 22a and a second holding portion 22b, which will be described hereinbelow, and an end portion 21a or an end portion 21b of the frame 21 to each other.

The holding portion 22 is configured of the first holding portion 22a and the second holding portion 22b.

The first holding portion 22a extends from an upper surface 24 (the surface on the end portion 21a side of the frame 21) and a lower surface 25 (that is, the surface on the end portion 21b side of the frame 21) of the supporter 20 toward the additive manufactured object 10. It is preferable that the tip of the first holding portion 22a be not joined to the additive manufactured object 10, and that the additive manufactured object 10 be movable inside the supporter 20. The tip of the first holding portion 22a may not come into contact with the additive manufactured object 10 (frame A1 in FIG. 3) or may come into contact therewith (frame A2).

The second holding portion 22b extends from the upper surface 24 and the lower surface 25 of the supporter 20 toward the other opposing surface and connects the upper surface 24 and the lower surface 25 together. The second holding portion 22b may be adjacent to the additive manufactured object 10 surrounded inside the supporter 20. In such a case, the second holding portion 22b and the additive manufactured object 10 are not joined to each other. Although not particularly limited, it is preferable that the second holding portion 22b and the additive manufactured object 10 do not come into contact with each other in consideration of the operation in the firing step S20 described hereinbelow.

The configuration of the holding portion as described above is suitable for suppressing the occurrence of deformation due to drying and firing in the manufacturing process of the additive manufactured fired body. Moreover, such configuration is also suitable from the viewpoint of improving the ease of removing the supporter fired body and taking out the additive manufactured fired body located thereinside.

However, the additive manufactured object 10 may be in a non-movable state inside the supporter 20 as long as the additive manufactured fired body is not deformed or damaged by detaching the supporter fired body. Moreover, as long as the effects of the present invention can be realized, the additive manufactured object 10 and the holding portion 22 may be joined to each other. For example, a part of the first holding portion 22a may be joined to the additive manufactured object 10. In this case, the additive manufactured part 10 may be in a non-movable state inside the supporter 20. Where a part of the first holding portion 22a is joined to the additive manufactured object 10, the additive manufactured object 10 can be stably held inside the supporter 20. With such a configuration, it is also possible to suitably suppress the occurrence of deformation due to drying or firing.

The width and the like of each lattice that constitutes the net is not particularly limited and can be appropriately set as necessary.

Further, in FIGS. 2 and 3, the holding portion 22 extends substantially vertically from the upper surface 24 and the lower surface 25 toward the additive manufactured object 10 or the other opposing surface but is not limited to this. As long as the effects of the present invention can be realized, the holding portion 22 may face the additive manufactured object 10 or the other opposing surface at an appropriate angle θ.

Although not particularly limited, the frame 21 may be provided with a through hole 21c as necessary. By providing the through hole, it becomes easier to discharge surplus powder from the inside of the supporter to the outside in the removing powder step, which will be described hereinbelow. The size, shape, and number of the through holes 21c are not particularly limited and can be appropriately set as necessary.

In the manufacturing method disclosed herein, the additive manufactured object and the supporter are manufactured together. Therefore, the constituent materials thereof can be the same powder for additive manufacturing. Various inorganic materials that can be included in this kind of powder for additive manufacturing can be selected without particular limitation for the powder for additive manufacturing. Also preferably, such powder for additive manufacturing may include an organic material (for example, a water-soluble organic material) as a binder.

As particles composed of an inorganic material (inorganic particles), for example, ceramic particles mainly composed of ceramics can be suitably used. Such ceramics include, but are not limited to, various metal oxides, metal nitrides, metal carbides, metal sulfides, and the like. In the present description, "metals" are inclusive of semimetals. For example, ceramic particles mainly composed of oxides, nitrides, carbides, sulfides, and the like including at least one element belonging to Groups 4 to 14 of the periodic table can be suitably used. Further, ceramic particles mainly composed of oxides, nitrides, carbides, sulfides, and the like including at least one element belonging to Group 2 of the periodic table can also be suitably used. Inorganic particles mainly composed of oxides, nitrides, carbides, sulfides, and the like including any one of the elements from among aluminum (Al), zirconium (Zr), titanium (Ti), zinc (Zn), nickel (Ni), iron (Fe), magnesium (Mg), calcium (Ca), and silicon (Si) are preferred. Ceramic particles mainly composed of oxides, nitrides, carbides, and the like including aluminum (Al) element can be suitably used.

Specifically, suitable examples of inorganic particles include inorganic particles composed mainly of any of oxide particles such as aluminum oxide (for example, alumina) particles, zirconium oxide (for example, zirconia) particles, titanium oxide (for example, titania) particles, silicon oxide (for example, silica) particles, zinc oxide particles, iron oxide particles, nickel oxide particles, cerium oxide (for example, ceria) particles, magnesium oxide (for example, magnesia) particles, chromium oxide particles, manganese dioxide particles, barium titanate particles, calcium carbonate particles, barium carbonate particles, and the like; nitride particles such as silicon nitride particles, boron nitride particles, and the like; carbide particles such as silicon carbide particles, boron carbide particles, and the like; and the like. One kind of inorganic particles may be used alone, or two or more kinds may be used in combination. Among them, alumina particles, zirconia particles, titania particles, silica particles, zinc oxide particles, and barium titanate particles are preferable because a high-strength shaped object can be formed. Alternatively, the inorganic particles may be composed of gypsum (for example, anhydrous gypsum (anhydrous calcium sulfate: $CaSO_4$)).

Alternatively, metal particles mainly composed of metal can be used as the inorganic particles. As the metal, various metals used in manufacturing using metal materials can be selected without particular limitation. For example, a metal element belonging to Groups 4 to 14 of the periodic table or an alloy containing at least one of such metal elements may be selected. Without being limited to this, an elemental magnesium (Mg) and an alloy containing Mg may also be used. As the metal, any metal element from among aluminum (Al), zirconium (Zr), titanium (Ti), zinc (Zn), nickel (Ni), iron (Fe), and magnesium (Mg) or an alloy including at least any one of these metal elements is preferred. Among them, aluminum particles, nickel particles, and iron particles are preferable as the inorganic particles because a high-strength shaped object can be formed.

In the present description, the expression "mainly composed of A" related to the composition of the inorganic particles and the binder described hereinbelow means that the proportion of A in the inorganic particles or the binder (purity of A) is 90% or more (preferably 95% or more) on a mass basis. The inorganic particles and the binder may contain unavoidable impurities.

The shape (outer shape) of the inorganic particles is not particularly limited. The inorganic particles may be spherical or non-spherical. From the viewpoint of mechanical strength, ease of manufacture, and the like, the inorganic particles are preferably spherical. Here, a "spherical shape" is inclusive of a substantially spherical shape.

The average particle size of the inorganic particles is not particularly limited and can be, for example, 5 μm or more and 100 μm or less. From the viewpoint of suitably maintaining the flowability of the powder for additive manufacturing, the average particle size of the inorganic particles is preferably 10 μm or more, more preferably 15 μm or more, and particularly preferably 20 μm or more. From the viewpoint of suppressing layer-by-layer misalignment, the average particle size of the inorganic particles is preferably 50 μm or less.

In the present description, unless otherwise specified, the "average particle size" means a particle size at an integrated value of 50% in the particle size distribution measured with a particle size distribution measuring device on the basis of a laser scattering/diffraction method, that is, a 50% volume average particle size (D50 size).

There are no particular restrictions on the content of the inorganic particles (inorganic material) in the powder for additive manufacturing. From the viewpoint of improving the mechanical strength or the like, the content of the inorganic particles is preferably 60 parts by mass or more, more preferably 70 parts by mass or more, and still more preferably 80 parts by mass or more when the total amount of the powder for additive manufacturing is taken as 100 parts by mass. The upper limit of the content of the inorganic particles is not particularly limited, but may be, for example, 95 parts by mass or less.

As described above, the powder for additive manufacturing may include a binder as needed. Although the shape of the binder is not particularly limited, it may be particulate, for example. The binder is a component that bonds the inorganic particles together. Such binder can be, for example, a water-soluble organic material. When such binder is mixed with a shaping liquid including water, the binder can be dissolved in water and can bond the inorganic particles to each other.

The material and properties of the water-soluble organic material are not particularly limited. For example, a water-soluble organic material composed mainly of any of a thermoplastic resin (vinyl alcohol resin, isobutylene resin, polyamide resin, polyester resin, and the like), a thermosetting resin (melamine resin and the like), a polysaccharide (cellulose derivative and the like), or a water-soluble wax is preferably used. As the water-soluble organic material, organic materials other than those described above (for example, polyethylene glycol and the like) may be used. Also, the water-soluble organic materials may be used singly or in combination of two or more.

The volume ratio of the binder to the total volume of the powder for additive manufacturing (which refers to the volume excluding the gaps between particles) is not particularly limited and can be approximately 20% by volume or more. Also, the volume ratio of the binder can be approximately 60% by volume or less.

The binder and the inorganic particles may not adhere to each other and may be present as independent particles. Alternatively, the binder may be attached to the surface of the inorganic particles from the viewpoint of improving the strength of the shaped object. That is, some or all of the inorganic particles may be covered (coated) with the binder.

The powder for additive manufacturing may optionally contain known additives that can be used in this kind of powder for additive manufacturing, such as a dispersant, a thickener, a printing aid, and the like. Since the content of such an additive may be set, as appropriate, according to the purpose of addition and does not characterize the present invention, detailed description thereof is omitted.

A method for preparing the powder for additive manufacturing is not particularly limited. The components to be contained in the powder for additive manufacturing may be mixed using a known mixing method. For example, commercially available V-type mixers, rocking mixers, tumbler mixers, mixing vessels and the like can be used. The mode in which these components are mixed is not particularly limited. For example, all the components may be mixed at once, or they may be mixed in an appropriately set order.

The powder for additive manufacturing can be used to shape an additive manufactured object, for example, in a mode where the powder is mixed with a water-containing shaping liquid.

Pure water, ultrapure water, ion-exchanged water (deionized water), distilled water, and the like can be preferably used as the solvent to be used in the shaping liquid. The shaping liquid may further include an organic solvent (lower alcohol, lower ketone, and the like) that can be uniformly mixed with water, if necessary. Usually, 40% by volume or more and 100% by volume or less of the solvent contained in the shaping liquid may be water. Such a shaping liquid can be mixed in a ratio of 20 parts by mass to 80 parts by mass (typically 40 parts by mass to 60 parts by mass) with 100 parts by mass of the powder for additive manufacturing during manufacturing.

The shaping liquid may contain known additives that can be used in the shaping liquid, such as a dye, an organic pigment, an inorganic pigment, a wetting agent, a flow rate increasing agent, and the like, if necessary. Since the content of such an additive may be set, as appropriate, according to the purpose of addition and does not characterize the present invention, detailed description thereof is omitted.

There are no particular limitations on the method for manufacturing an additive manufactured object using the powder for additive manufacturing. For example, an additive manufactured object can be manufactured by using a powder for additive manufacturing to form a layer of the powder and then supplying a shaping liquid to a predetermined region of the layer. For example, an additive manufactured object can be shaped using a 3D printer that shapes a stereo object based on three-dimensional data or the like corresponding to the additive manufactured object to be shaped. Such a 3D printer may include an inkjet that drops the shaping liquid and a stage on which the powder for additive manufacturing is placed.

An additive manufactured object can be shaped by repeating the below-described operations 1 to 3 and successively layering the layers made of the powder for additive manufacturing.

Operation 1: the powder for additive manufacturing is loaded (deposited) in layers on a stage to obtain a thickness (for example, 0.01 mm to 0.3 mm) corresponding to each layer of the additive manufactured object that is to be shaped.

Operation 2: the shaping liquid is dropped from the inkjet head onto the part to be cured (that is, the part corresponding to the part of the additive manufactured object to be shaped) of the powder for additive manufacturing (deposit) loaded in layers. The binder contained in the portion onto which the shaping liquid has been dropped is dissolved to bond the inorganic particles and form a cured layer (layered solid matter).

Operation 3: the stage is lowered vertically by the thickness corresponding to each layer of the additive manufactured object.

After that, the powder for additive manufacturing that has not been cured is finally removed (also called the "powder removal step"), and shaping of the additive manufactured object is completed. Such an additive manufactured object is formed by bonding a large number of inorganic particles with a dissolved binder. After shaping, the additive manufactured object obtained may be dried. Although the drying time is not particularly limited, it is generally about 1.5 hours to 24 hours, preferably 15 hours to 20 hours.

Although not particularly limited, the manufacturing method disclosed herein may include an impregnation step as necessary. In the impregnation step, the supporter and the additive manufactured object shaped in the shaping step S10 are impregnated with a coupling liquid including a coupling agent. As a result, the coupling liquid (coupling agent) enters between the inorganic particles that constitute the additive manufactured object. By performing the impregnation step, the mechanical strength of the additive manufactured object and the additive manufactured fired body can be improved.

As for the coupling agent contained in the coupling liquid, any coupling liquid commonly used in this kind of powder additive manufacturing art can be used without particular limitation. Suitable examples include, for example, a coupling agent containing silicon (Si), a coupling agent containing aluminum (Al), a coupling agent containing titanium (Ti), and a coupling agent containing zirconia (Zr).

Since the kind of the coupling agent and the composition of the coupling liquid do not characterize the present invention, detailed descriptions thereof are omitted.

A method for impregnating the additive manufactured object with the coupling liquid is not particularly limited. For example, a method for impregnating the additive manufactured object with the coupling liquid by immersing the additive manufactured object in the coupling liquid, a method for impregnating the additive manufactured object with the coupling liquid by applying the coupling liquid to the additive manufactured object, and the like can be adopted. When the additive manufactured object is immersed in the coupling liquid, the immersion time may be such that the coupling liquid sufficiently penetrates into the gaps between the inorganic particles in the powder for additive manufacturing. Such immersion time is usually 30 seconds to 600 seconds, and may be, for example, 50 seconds to 120 seconds.

After removing the additive manufactured product from the coupling liquid, the additive manufactured product may be naturally dried before firing. Although the drying time is not particularly limited, it may be about 1 hour to 10 hours, for example, 2 hours to 5 hours.

<Firing Step>

In the firing step S20, the additive manufactured object and the supporter are fired to obtain the additive manufactured fired body and the supporter fired body. This step is not particularly limited, but for example, can be implemented under a firing schedule of raising the temperature from room temperature to a maximum firing temperature at a constant rate under an arbitrary gas atmosphere, firing the object to be fired at the maximum firing temperature for a predetermined time, and lowering the temperature at a constant high temperature rate.

The gas atmosphere during firing is not particularly limited, but may be, for example, an air atmosphere, an oxygen atmosphere, a water vapor atmosphere, or an inert atmosphere such as a nitrogen atmosphere or an argon atmosphere. When the powder for shaping includes a binder, an air atmosphere or an oxygen atmosphere is preferable considering the thermal decomposition of the binder.

The temperature conditions for firing are not particularly limited, and the maximum firing temperature may be set within the range of 600° C. or higher and 1650° C. or lower. By setting the firing temperature within this range, the inorganic particles contained in the powder for additive manufacturing can be efficiently sintered. Moreover, when the powder for shaping includes a binder, the binder can be efficiently thermally decomposed and removed under such temperature conditions. Furthermore, when the impregnation step is performed, firing under the temperature conditions described above enables efficient sintering between the inorganic particles via the metal element in the coupling agent.

The rate of temperature increase is not particularly limited, but can be, for example, 0.1° C./min to 10° C./min, preferably 1° C./min to 10° C./min.

The firing time at the maximum firing temperature is not particularly limited, but it is generally 1 hours to 10 hours (preferably 1.5 hours to 5 hours particularly preferably 2 hours to 3 hours).

The temperature drop rate is not particularly limited, but can be, for example, 0.1° C./min to 50° C./min, preferably 1° C./min to 10° C./min.

Various conditions in the firing step S20 may vary depending on the constituent materials of the additive manufactured object and the supporter, the presence or absence of a binder, and the desired density of the fired body, and thus can be changed as appropriate.

Although not particularly limited, heat treatment may be separately performed, if necessary, at a temperature condition lower than the maximum firing temperature before firing at the maximum firing temperature. For example, when a powder for shaping including a binder is used, a treatment of removing the binder from the additive manufactured object and the supporter can be performed. In such binder removal treatment, for example, a heat treatment may be performed in advance for a predetermined period of time under a temperature condition at which the binder is burned out. The temperature conditions and time for the binder removal treatment are not particularly limited, and can be changed, as appropriate, depending on the kind, content, and the like of the binder.

In the firing step S20, firing is performed so that the additive manufactured object and the supporter are not joined to each other. The means therefor is not particularly limited as long as the objective can be achieved, but for example, the use of an interference material for preventing direct contact between the additive manufactured object and the supporter during firing can be mentioned. Where the additive manufactured object and the supporter are fired in a state where the interference material is arranged therebetween, sintering between the additive manufactured object and the supporter can be effectively prevented.

As the interference material, various inorganic substances used to achieve this kind of purpose can be suitably used. Such an inorganic substance preferably has, for example, high heat resistance and flowability, and preferably has a sintering temperature higher than the sintering temperature of the inorganic particles contained in the powder for additive manufacturing. Preferred, but not particularly limiting, examples include alumina, mullite, calcined kaolin, silicon carbide, and the like.

Although not particularly limited, the interference material preferably has a shape and size different from those of the inorganic particles contained in the powder for additive manufacturing. Although the shape is not particularly limited, the interference material may be plate-like or particulate-like, for example. Preferably, the interference material may be inorganic particles having a larger average particle size than the average particle size of the inorganic particles contained in the powder for additive manufacturing. In addition, the inorganic particles as the interference material may be of a different kind from the inorganic particles contained in the powder for additive manufacturing or may be of the same kind.

After the firing, the interference material and the powder for additive manufacturing that has not been solidified are removed. Then, an additive manufactured fired body and a supporter fired body are obtained. Since the configurations of the additive manufactured fired body and the supporter fired body are the same as the configurations of the additive manufactured object 10 and the supporter fired body 20, description thereof will be omitted herein.

<Detaching Step>

In the detaching step S30, the supporter fired body is detached to separate the supporter fired body and the additive manufactured fired body. A method for detaching the supporter fired body is not particularly limited. The supporter fired body can be removed by cutting, grinding, and the like by conventional methods. More specifically, the supporter fired body can be removed by cutting with a diamond cutter or the like.

The additive manufactured fired body disclosed herein is manufactured through a manufacturing method including a manufacturing step of manufacturing an additive manufactured object by using powder for additive manufacturing, and a firing step of obtaining an additive manufactured fired body by firing the additive manufactured object. In the manufacturing step, a supporter that supports the additive manufactured object is manufactured together with the additive manufactured object so as to surround the additive manufactured object by using the powder for additive manufacturing. The additive manufactured fired body obtained through the manufacturing method is arranged in a state of being surrounded by the supporter fired body that supports the additive manufactured fired body. Therefore, deformation of the additive manufactured fired body is suppressed at a high level.

The art disclosed herein can be preferably applied, for example, in the manufacturing process of cores for precision casting for manufacturing parts that have a complex structure and are required to have a high-precision structure (for example, moving and stationary vanes (turbine blades) of industrial gas turbines, heat-resistant structural parts that are used in high-temperature environments, such as jet engines, turbochargers, and the like).

Modification Example 1

In the above embodiment, the additive manufactured object 10 is entirely arranged inside the supporter 20 (see FIGS. 2 and 3), but this configuration is not limiting. As long as the effects of the present invention can be realized, the additive manufactured object 10 does not necessarily have to be entirely arranged inside the supporter 20, and a part thereof may be arranged outside the supporter 20. Although not particularly limited, a part of the additive manufactured object 10 can be arranged outside the supporter 20 (that is, the frame 21 and the holding portion 22).

Figure 4:
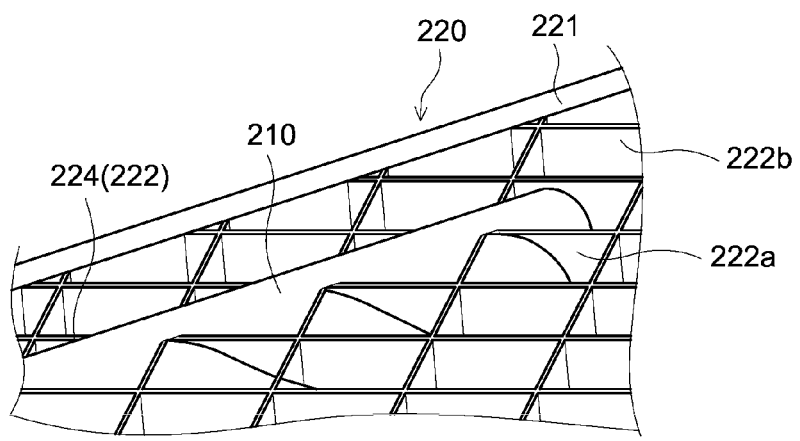
FIG. 4 is a schematic partial perspective view showing an additive manufactured object and a supporter according to Modification Example 1.

As shown in FIG. 4, an additive manufactured object 210 is arranged almost entirely inside a supporter 220, but a part thereof passes through a holding portion 222 (upper surface 224 in FIG. 4) and protrudes outside of the supporter 220. From the viewpoint of preventing deformation after firing, when the total volume of the additive manufactured object 210 is taken as 100% by volume, the volume ratio of the additive manufactured object 210 that can be arranged outside the supporter 220 is, for example, less than 50% by volume, or 30% by volume or less, preferably 20% by volume or less, and more preferably 10% by volume or less. That is, 50% by volume to 100% by volume of the additive manufactured object 210 may be arranged inside the supporter 220.

As illustrated, the first holding portion 222a is not formed toward the portion of the additive manufactured product 210 that passes through the holding portion 222 and protrudes outside. Therefore, in Modification Example 1, the first holding portion 22a (see FIGS. 2 and 3), which is formed on the upper surface 24 side in the above embodiment, may not be formed. That is, in Modification Example 1, the first holding portion 222a may not be formed on the upper surface 224 side.

As long as the additive manufactured object 210 and the holding portion 222 are not joined by firing, the additive manufactured object 210 and the holding portion 222 may or may not be in contact with each other at the location where the additive manufactured object 210 protrudes to the outside. Considering the powder removal step before firing and the arrangement of the interference material, it is preferable that the additive manufactured object 210 and the holding portion 222 be not in contact with each other. However, the additive manufactured object 210 and the supporter 220 may be in contact with each other as long as there is no inconvenience in the powder removal step or the arrangement of the interference material.

Although the additive manufactured object 210 protrudes to the outside from the upper surface 224 in FIG. 4, this configuration is not limiting. The location where the additive manufactured object 210 protrudes may be a part of the lower surface or a part of the frame 221.

The configurations of the first holding portion 222a and the second holding portion 222b are the same as in the above embodiment. In addition, since various matters related to the manufacturing process are the same as those of the above-described embodiment, description thereof will be omitted herein.

Modification Example 2

In the above embodiment, the shape of the holding portion 22 is not particularly limited as long as the holding portion stably holds the additive manufactured object 10 inside the supporter 20 and as long as the additive manufactured object 10 in a state of being surrounded inside can be visually recognized from the outside of the supporter 20. That is, the holding portion 22 does not necessarily have a mesh shape, and may be, for example, a porous plate.

Some examples of the present invention will be described below, but the present invention is not intended to be limited to the configurations shown in the examples.

Example 1

In Example 1, an additive manufactured fired body and a supporter fired body having the shapes shown in FIGS. 2 and 3 were produced.

In order to produce the additive manufactured fired body according to Example 1, first, the additive manufactured object 10 shown in FIG. 2 and the supporter 20 surrounding the additive manufactured object were designed. As the additive manufactured object 10, a rectangular parallelepiped test piece as shown in the figure was designed. As the supporter 20, a supporter having the frame 21 and the holding portion 22 was designed. The upper surface 24 and the lower surface 25 of the supporter according to Example 1 had a net-like shape (mesh shape).

Here, the additive manufactured object 10 and the supporter 20 were designed so as not to be joined to each other in the firing step, which will be described hereinbelow. That is, a configuration was designed in which the additive manufactured object 10 and the supporter 20 were separated from each other by a gap. The additive manufactured object 10 was in a movable state inside the supporter 20.

Figure 5:
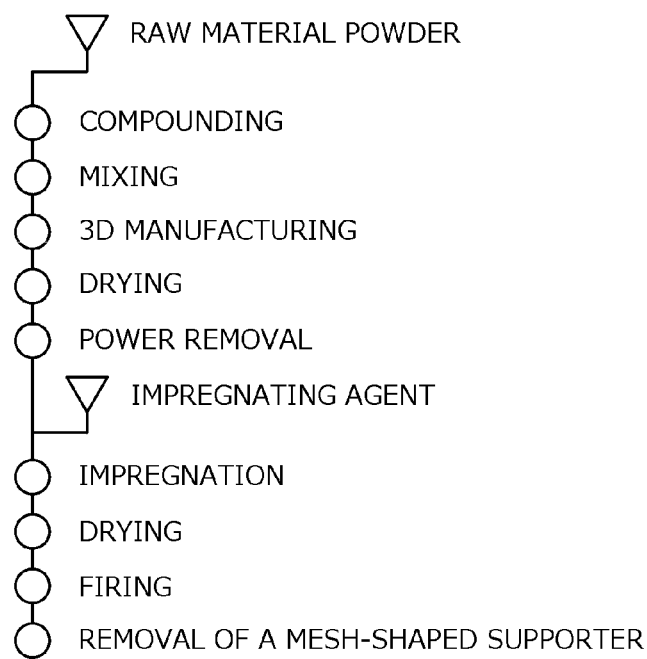
FIG. 5 is a schematic diagram showing the procedure of a preferred example according to the present invention.

As shown in FIG. 5, a mixed powder of silica and alumina was prepared as raw material powder. The weight ratio of silica and alumina in this mixed powder was 80:20. The mixed powder was adjusted to have a particle size D(10) of 5 μm, a particle size D(50) of 30 μm, and a particle size D(90) of 90 μm. Such particle size D (10), particle size D (50), and particle size D (90) are particle sizes at integrated values of 10%, 50%, and 90% in a flow distribution measured with a particle size distribution measuring device (trade name: Microtrac MT-3000II, distributor: Microtrac—Bell Co., Ltd.) based on a laser scattering and diffraction method. This mixed powder and PVA were compounded at a mass ratio of 90:10 and mixed for 20 min with a commercially available mixer (trade name: Rocking Mixer (type: RM GHLV-30 (S) HD/MC)), distributor: Aichi Electric Co., Ltd.) to obtain a powder for additive manufacturing. This powder for additive manufacturing was put into ProJet460Plus manufactured by 3D Systems, Inc., and an additive manufactured object and a supporter were 3D-shaped together. The additive manufactured object and the supporter were then dried at room temperature for 16 hours. Next, the powder for additive manufacturing that was not cured was removed (powder removal). Here, the mobility of the additive manufactured object inside the supporter was checked. The distinction between movable and non-movable additive manufactured object here is shown in the corresponding column of Table 1.

Next, a silane coupling agent (3-aminopropyltriethoxysilane) was prepared as an impregnating agent (coupling agent). The additive manufactured object and the supporter thus shaped were immersed in the impregnation liquid for 1 minute to impregnate the additive manufactured object and the supporter with the impregnation liquid (impregnation).

After that, the additive manufactured object and the supporter were taken out from the impregnation liquid, dried in the air for 1 hour, and then dried at 65° C. for 1 hour.

Figure 6:
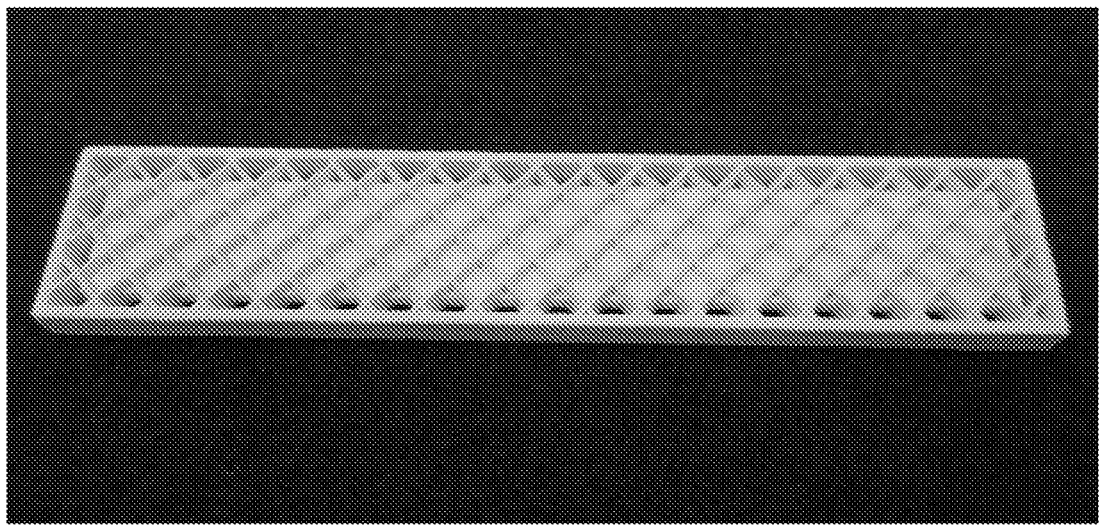
FIG. 6 is an observation image of the additive manufactured fired body and the supporter fired body according to the above example.

Next, the additive manufactured object and the supporter after drying were embedded in alumina powder (average particle size 80 μm to 90 μm) (Alcoa Corporation) as an interference material. In this state, the additive manufactured object and the supporter were fired. The specific firing conditions were to raise the temperature to 1250° C. at a temperature rise rate of 2° C./min in an air atmosphere and hold the temperature at 1250° C. for 2 hours. By such firing, an additive manufactured fired body and a supporter fired body were obtained (FIG. 6).

Next, the supporter fired body was cut with a diamond cutter and removed to separate the additive manufactured fired body.

Next, using an ATOS Capsule manufactured by Marubeni Information Systems Co., Ltd. as a measuring instrument, three-dimensional shape data of the additive manufactured fired body were acquired. These three-dimensional shape data were compared with 3D data (design data) of the three-dimensional shape of the additive manufactured object before firing. The amount of deformation caused by the drying and firing was calculated. The maximum value of the deformation amount is shown in Table 1 in the "Deformation amount" column.

Example 2

In Example 2, an additive manufactured fired body and a supporter fired body having the shapes shown in FIG. 2 were produced. First, the additive manufactured object 10 and the supporter 20 surrounding the additive manufactured object were designed (see FIG. 2). However, in Example 2, the additive manufactured object 10 and the supporter 20 were designed to be joined to each other in the firing process. In Example 2, the additive manufactured object 10 and the supporter 20 were not separated from each other due to air gaps. In Example 2, no interference material was used for embedding.

Apart from that, an additive manufactured fired body and a supporter fired body according to Example 2 were produced using the same materials and methods as in Example 1. In Example 2, the supporter fired body could not be removed after firing. Therefore, in Example 2, the three-dimensional shape data of the additive manufactured object and the additive manufactured fired body were not compared. The appropriate column of Table 1 for Example 2 includes "-" which indicates that such data comparison was not performed.

Example 3

In Example 3, only the additive manufactured object 10 was shaped and fired to obtain only an additive manufactured fired body (see FIG. 2). That is, in Example 3, the supporter 20 was not shaped and the supporter fired body was not produced. In Example 3, no embedding using an interference material was performed.

Apart from that, the additive manufactured fired body according to Example 3 was produced using the same materials and methods as in Example 1. Using the same method as in Example 1, the three-dimensional shape of the additive manufactured fired body according to Example 3 was compared with the three-dimensional shape of the additive manufactured object. The data obtained for Example 3 are shown in Table 1. In Example 3, since the supporter was not shaped as described above, the mobility of the additive manufactured object inside the supporter was not evaluated. Therefore, "-" is entered in the corresponding column.

TABLE 1

|  | Example 1 | Example 2 | Example 3 |
|---|---|---|---|
| Presence or absence of a supporter | Present | Present | Absent |
| Mobility of additive manufactured object inside a supporter | Movable | Non-movable | — |
| Shaping results | No deformation | — | Presence of deformation |
| Maximum size deviation after firing (mm) | 0.4 | — | 2.3 |

As shown in Table 1, in Examples 1 and 2, a supporter surrounding the additive manufactured object was manufactured when the additive manufactured object was manufactured, and the deformation between the additive manufactured object before firing and the additive manufactured object after firing during was remarkably suppressed. In Example 1, the additive manufactured object and the supporter were fired so as not to be joined to each other. Therefore, the supporter fired body could be easily removed from the additive manufactured fired body, after firing. In addition, when the supporter fired body was removed, the occurrence of damage to the additive manufactured fired body due to such removal was suppressed more remarkably.

Meanwhile, in Example 3, a supporter surrounding the additive manufactured object was not manufactured. In Example 3, deformation such as warpage was confirmed when the additive manufactured object was dried.

From the above, with a method for manufacturing an additive manufactured fired body, comprising: a manufacturing step of manufacturing an additive manufactured object by using powder for additive manufacturing, and a firing step of obtaining the additive manufactured fired body by firing the additive manufactured object, wherein in the manufacturing step, a supporter that supports the additive manufactured object is manufactured together with the additive manufactured object so as to surround the additive manufactured object by using the powder for additive manufacturing, deformation due to drying or firing of the additive manufactured object can be remarkably suppressed.

Specific examples of the present invention have been described in detail above, but these are merely examples and do not limit the scope of the claims. The art described in the claims includes various modifications and changes of the specific examples illustrated above.

REFERENCE SIGNS LIST

10 Additive manufactured object
20 Supporter
21 Frame
22 Holding portion
24 Upper surface
25 Lower surface
210 Additive manufactured obj ect
220 Supporter
221 Frame
222 Holding portion
S10 Manufacturing step
S20 Firing step
S30 Detaching step

The invention claimed is:

1. A method for manufacturing an additive manufactured fired body, the method comprising:
   a manufacturing step of manufacturing an additive manufactured object by using an additive manufacturing powder; and
   a firing step of obtaining the additive manufactured fired body by firing the additive manufactured object,
   wherein the manufacturing step includes manufacturing, together with manufacturing the additive manufactured object, a supporter surrounding and supporting the additive manufactured object,
   wherein manufacturing the supporter includes manufacturing, by using the additive manufacturing powder, a frame of the supporter such that the frame has openings therein,
   wherein manufacturing the supporter includes manufacturing, by using the additive manufacturing powder, a holding portion of the supporter disposed inside the frame such that the holding portion has a mesh shape and spans at least one of the openings of the frame,
   wherein the holding portion comprises a first holding portion and a second holding portion,
   wherein the first holding portion extends from an upper surface on one end portion of two ends of the supporter and a lower surface on another end portion of the two ends of the supporter toward the additive manufactured object,
   wherein tips of the first holding portion do not come into contact with the additive manufactured object, wherein the second holding portion extends from the upper surface and the lower surface of the supporter toward an opposing surface and connects the upper surface and the lower surface, wherein the second holding portion and the additive manufactured object do not come into contact with each other, wherein the additive manufactured object and the supporter have same constituent materials, wherein the frame of the supporter is open on two ends in one direction, wherein the holding portion spans the openings of the frame, and wherein the additive manufactured object is movable inside the supporter.

2. The manufacturing method according to claim 1, wherein in the firing step, the additive manufactured fired body and a fired body of the supporter are obtained by firing so that the additive manufactured object and the supporter are not joined to each other.

3. The manufacturing method according to claim 2, further comprising:

a detaching step of separating the fired body of the supporter and the additive manufactured fired body by cutting or grinding.

4. The manufacturing method according to claim 1, wherein in the firing step, the additive manufactured fired body and a fired body of the supporter, which are mutually independent, are obtained by firing the additive manufactured object and the supporter in a state in which an interference material composed of an inorganic substance for preventing the additive manufactured object from coming into contact with the supporter is arranged between the additive manufactured object and the supporter.

5. The manufacturing method according to claim 1, wherein the additive manufacturing powder includes ceramic particles.

6. The manufacturing method according to claim 5, wherein the ceramic particles include any of oxides, nitrides, carbides, and sulfides including at least one element selected from the group consisting of aluminum (Al), zirconium (Zr), titanium (Ti), zinc (Zn), nickel (Ni), iron (Fe), magnesium (Mg), calcium (Ca), and silicon (Si).

7. The manufacturing method according to claim 5, wherein in the firing step, the additive manufactured fired body and a fired body of the supporter, which are mutually independent, are obtained by firing the additive manufactured object and the supporter in a state in which an interference material composed of an inorganic substance for preventing the additive manufactured object from coming into contact with the supporter is arranged between the additive manufactured object and the supporter, and the interference material is configured to be particulate, and an average particle size of the particulate interference material is larger than an average particle size of the ceramic particles.

* * * * *